United States Patent [19]

Kane

[11] 4,075,103

[45] Feb. 21, 1978

[54] FABRICATED DISC FILTER CORE

[76] Inventor: Alfred J. Kane, 1470 Washington St., Munising, Mich. 49862

[21] Appl. No.: 701,197

[22] Filed: June 30, 1976

[51] Int. Cl.² ...................... B01D 33/26; B01D 35/12
[52] U.S. Cl. ................................... 210/331; 210/347; 210/404
[58] Field of Search ............... 210/326, 327, 330, 331, 210/346, 347, 402-404, 406

[56] References Cited

U.S. PATENT DOCUMENTS

| 1,223,245 | 4/1917  | Biesel         | 210/404 X |
| 2,799,397 | 7/1957  | Berline        | 210/331   |
| 2,894,632 | 7/1959  | Myers          | 210/347 X |
| 2,932,402 | 4/1960  | Logue          | 210/383   |
| 3,283,906 | 11/1966 | Crane et al.   | 210/347 X |
| 3,291,312 | 12/1966 | Peterson       | 210/347 X |
| 3,361,262 | 1/1968  | Orr et al.     | 210/330   |
| 3,659,716 | 5/1916  | Peterson et al.| 210/347 X |
| 3,724,668 | 4/1973  | Ohlquist       | 210/331   |
| 3,825,124 | 7/1974  | Davis          | 210/333 X |
| 3,890,235 | 6/1975  | Davis          | 210/402 X |
| 3,960,729 | 6/1976  | Peterson et al.| 210/347 X |

Primary Examiner—Morris O. Wolk
Assistant Examiner—Michael S. Marcus
Attorney, Agent, or Firm—McGarry & Waters

[57] ABSTRACT

A disc filter assembly in which a plurality of filter discs are attached to a common shaft. The common shaft is a fabrication which has a central common mandrel. Saddles are rigidly attached to the common mandrel. Pipe segments are removably attached to the saddles. The pipe segments have at least one aperture which allows passage of filtrate from the filter to the pipe segments. The pipe segments are aligned and connected to form a continuous passage with an end piece which is mounted for rotation above a slurry container. The end piece has apertures therethrough aligned with the pipe segments. The end piece is operably connected to the pipe segments to form a continuous passage therethrough. The filter assembly is used to filter liquids from a taconite or other particulate slurry.

13 Claims, 11 Drawing Figures

FABRICATED DISC FILTER CORE

BACKGROUND OF THE INVENTION

1. Field of the Invention

This invention relates to disc filters and more particularly to a fabricated central shaft of such disc filters.

2. Description of the Prior Art

Disc filter bags have long been used in conjunction with a rotatable central core for filtering taconite or other particulate slurries. The disc filter bag assembly rotates about the core to sequentially submerge successive filter bags in a slurry. A vacuum draws the slurry filtrate through the filter bags. The filter bags are operably connected to a conduit within the central core. The filtrate enters the conduit and is drawn out through the ends of the central core.

The use of powerful vacuum pumps creates problems when a filter bag tears. Unfiltered slurry containing iron ore fillings, coal particles or other industrial particulates is then forcefully drawn into the conduit and causes erosion and failure within the conduit. The erosion is particularly severe within a section of the conduit opposite the aperture leading to the filter bag.

Various modifications and improvements to the disc filter assembly have been sought to improve the reliability of the central core and to lessen the cost of the repair and replacement due to the wear and tear of the central shaft.

The conventional but unsatisfactory solution to the problem of erosion is to make the central core from a solid cylindrical piece of cast iron. The conduit passageways are radially placed around axis of the core with a substantially thick iron wall surrounding each conduit. The central area of the iron core is hollowed to provide a lighter weight iron core. When a conduit is eroded, the conduit is rebored a little wider. However, the erosion eventually eats away to the hollow central area of the core, causing a break in the conduit. The break in the conduit renders the conduit inoperative, and causes a general loss of vacuum efficiency.

Replacement of the eroded iron core is costly and time-consuming. Part of the high cost of replacing the iron core is due to the fine machining required to have different sections of the iron core aligned correctly with other sections so that they rotate around their axis without wobble. The time required to replace the iron core is great since the whole filter disc assembly must be disassembled and reassembled onto the new iron core.

Since replacement of the iron core is expensive and time-consuming, the eroded conduit would be plugged up at the point of erosion. At least one filter disc bag would become inoperative, since the plug would block any passage from the filter bag to the conduit. The iron core is used until a number of filter bags become inoperative due to a plurality of plugs sealing off major sections of the conduits. The economics of replacing an iron core demanded that a crippled iron core be used long beyond the point where the iron core is being used efficiently.

Various solutions to the erosion problem have been proposed. In the U.S. Pat. No. 3,659,716, issued to Peterson et al on May 2, 1972, certain of the problems were explicitly aproached. The Peterson et al patent discloses a filter disc central core assembly comprising a plurality of longitudinal pipes having a rectangular shape with reinforced surfaces on the opposite side of the apertures in the pipes. At the apertures of the rectangular pipes, removable castings are attached thereto. The castings have angled walls which receive the blasting force of the filtrate. The removable castings would have to be replaced at regular intervals of time. A combination of the reinforced surface opposite the aperture and the castings designed to receive the force of the flow is designed to increase the time interval before the necessary replacement of the center core.

Another proposed solution to ease the repairing cost is disclosed in the U.S. Pat. No. 2,894,632 issued to R. B. Myers on July 14, 1959. The Myers reference discloses modified filter segments integrally connected to a pipe segment which are rotatably mounted onto a central shaft. If the filter segment is ripped or the pipe segment is worn, only that section need be replaced. However, the invention disclosed in the Myers reference is not compatable to be incorporated in part with the conventional central cores and conventional disc filter bags.

SUMMARY OF THE INVENTION

According to the invention, a filter disc central core is a fabricated structure. A plurality of pipe segments are circumferentially positioned about the central core. Each pipe segment has a hollow interior. The hollow interior of at least one pipe segment forms a passageway for the flow of filtrate therethrough. Preferably the pipe segments are secured to an elongated skeletal fabrication and aligned so that at least one conduit passageway is formed through the interior of the aligned pipe segments. Most of the pipe segments have at least one side aperture where the filter disc may have its nozzle connected to the pipe segment to form a passageway from the filter to the pipe segments. Between each aligned pipe segment are means to maintain the alignment and to maintain a leakproof conduit passageway. A vacuum means is in fluid communication with the conduit passageway.

Means for rotatably mounting a central core above a tank containing a filtrate is operably connected to the core near the ends thereof.

Preferably, the skeletal fabrication includes a central hollow common mandrel which has pipe securing elements rigidly attached thereto at spaced intervals. The pipe securing elements are preferably arranged at regular intervals along the common mandrel. The pipe segments are removably attached to the pipe securing elements. Preferably, a plurality of pipe segments attach to each pipe securing element. The pipe securing elements are positioned on the common mandrel so as to align pipe segments to corresponding pipe segments attached to other pipe securing elements (hereinafter referred to as "saddles.")

Preferably, the saddles are made out of at least one disc having a hollow central area where the common passes therethrough. The discs are preferably perpendicular to the axis of the common mandrel. Preferably, at the outer circumference of each disc are attached a plurality of plates which are attached to each disc. The plates preferably radiate outwardly from the common mandrel and have their plane preferably intersect along the axis of the common mandrel. Preferably, the plates are spaced apart around the circumference of the discs so that the pipe segments can be positioned between the plates and spaced from the central mandrel. If desired, the pipe segment can have a thickened portion opposite the aperture for increased durability against erosion. Clamping means are attached to each plate and releasably secure the pipe segment in a fixed position between the two plates. The pipe segment is positioned between the two plates so that the side aperture passing through the cylindrical surface of the pipe is positioned at the outer circumference of the fabrication.

In a specific embodiment, a portion of the plate at the outer circumference is thickened so as to allow threaded apertures to partially pass therethrough. The threaded aperture receives a threaded fastener which secures the filters to the central fabrication. The pipe segment is operably connected to the filter so as to form a passage from the filter bag to the pipe segment.

Preferably, at an end of the fabrication an end piece having apertures therethrough is rigidly attached to the common mandrel. The apertures are aligned with the pipe segments. The pipe segments are then connected to the end piece so as to form a continuous passage from the apertures of the filter through the pipe segments and through the end piece.

The end piece is preferably cylindrical and has a smooth outer circumference to allow it to rotate when rotational force is applied to it. Preferably, the mounting means operably engages the endpiece.

Preferably, the pipe segment at its aperture has a connector pressed into it. The connector is shaped to receive the conventional filter nozzle which is in fluid communication with the interior of the filters.

Any pipe segment can be replaced at the time of routine maintenance and repair of disc filters. As the filters are checked, erosion of pipe segments can also be checked. If any pipe segments show signs of erosion and are desirable to be replaced, they can be replaced at the time of the discovery of the erosion. The fabrication of the common mandrel, saddles, pipe segments, and clamp means allows any individual pipe segment to be removed without removal of other pipe segments. Major disassembly of the shaft is not necessary to remove an individual pipe segment. Therefore as individual pipe segments become worn, they are replaced at that time.

The fabricated central shaft allows increased efficiency of disc filters in that operation of a crippled shaft which has one or two pipe lines inoperative due to apertures of erosion is eliminated. Increase of efficiency is also due to the fact that with regular maintenance and replacement of the pipe segments, the vacuum has no percentage loss due to broken passageways or inoperative passageways.

The pipe segments can be of various lengths having various numbers of apertures connecting to the filters. The desired lengths can be based on the desirability of ease of replacing a pipe segment, or the degree of efficiency which is desired in the vacuum. The invention represents a significant improvement in construction of central cores for disc filters. The innovation of the segmented pipe allows easy replacement of an eroded pipe segment during the routine check-up of the filters so that a disc filter vacuum assembly can be run at a peak efficiency at nearly all times. No large repair costs or large amounts of time loss would be encountered with the routine replacement of the pipe segments as compared to the conventional boring or replacement of the central core. Since the pipe replacement operation is simple and relatively fast, the pipe replacement takes place during normal down time for the filter assembly. Another advantage of this invention is that conventional tanks, filter discs and motors which are used with the conventional iron core can be used interchangeably with the invention.

BRIEF DESCRIPTION OF THE DRAWINGS

The invention will now be described with reference to te accompanying drawings, in which.

DETAILED DESCRIPTION OF THE PREFERRED EMBODIMENT

Figure 1:
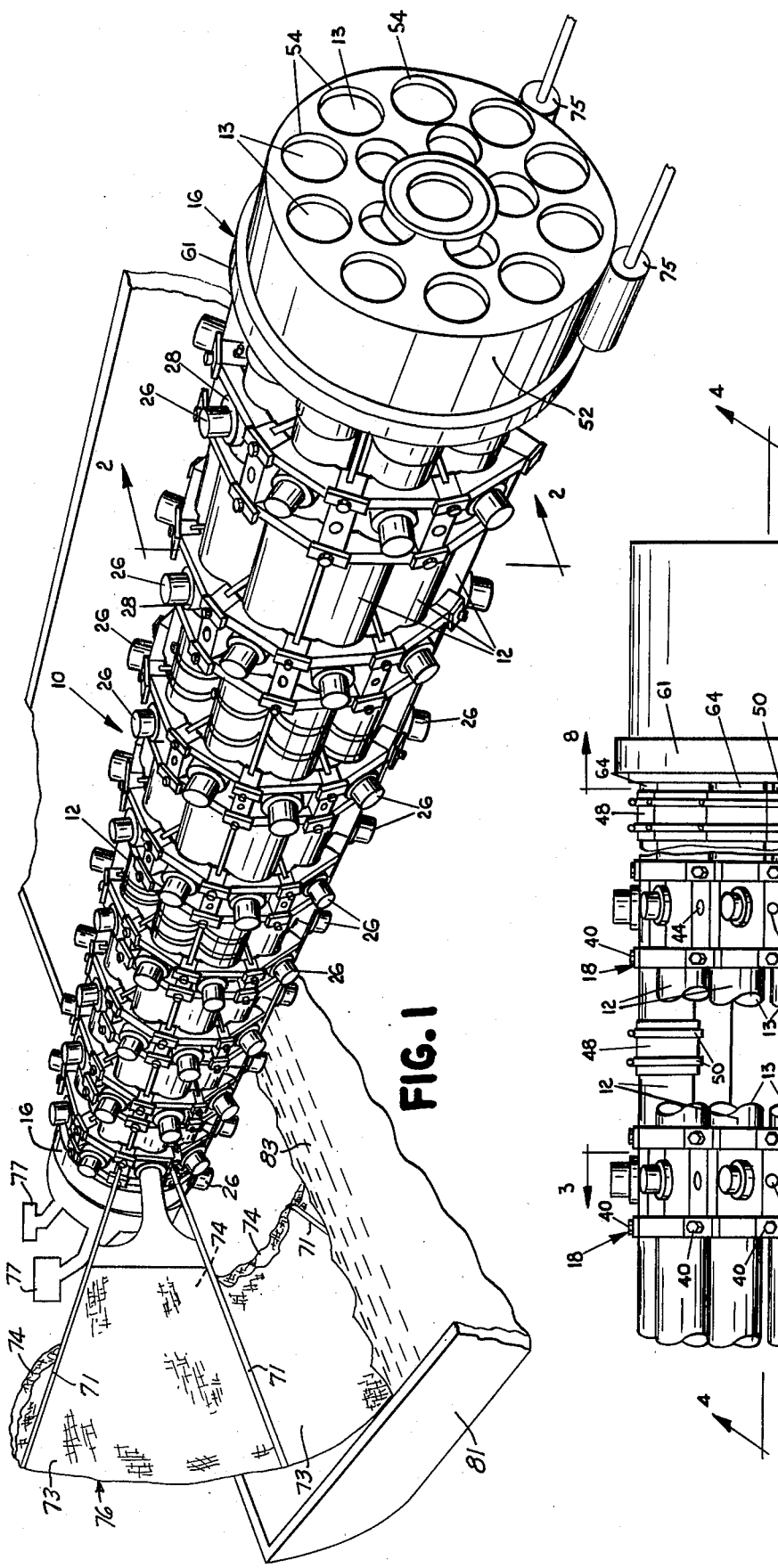
FIG. 1 is a fragmentary perspective and partially schematic view of a filter disc assembly with a filter core which embodies the invention.

As shown in FIG. 1, a structural fabrication 10 has a cylindrical shape. Along the outer circumference of the structural fabrication 10 are sets of aligned pipe segments 12 forming conduit passages 13 running the length of the cylindrical structural fabrication 10. The conduit passage 13 is clearly shown in FIG. 4. The pipe segments 12 form ten conduit passages 13. Each conduit 13 is parallel to and the same distance from the central axis of the structural fabrication.

Figure 5:
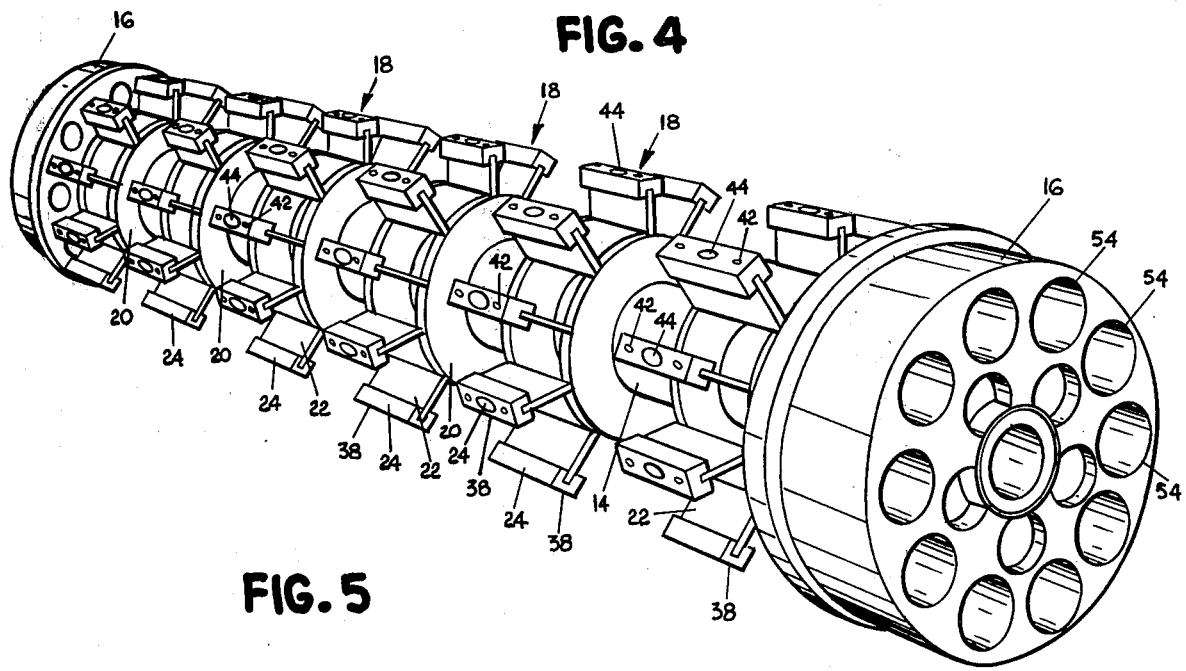
FIG. 5 is a perspective view of a skeletal fabrication of a second embodiment of the invention having a less number of mounted saddles.
Figure 6:
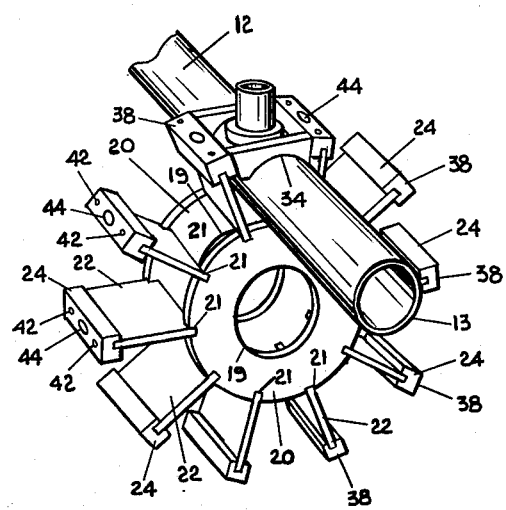
FIG. 6 is a perspective and partially broken view of the saddle and a correctly positioned pipe segment of the filter core shown in FIG. 1.
Figure 8:
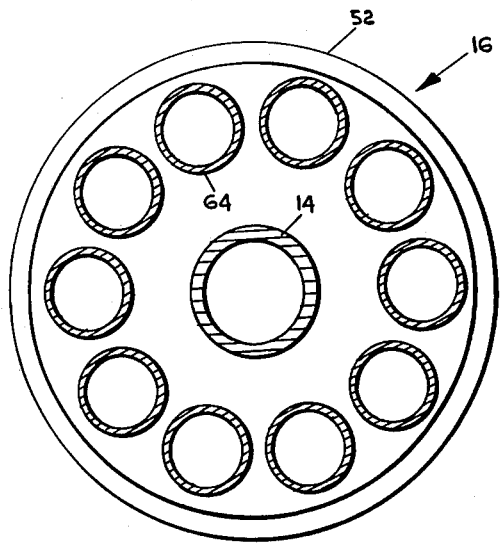
FIG. 8 is a cross-sectional view taken along lines 8—8 of FIG. 2.

As shown in FIG. 5, a common mandrel 14 is rigidly attached to endpieces 16. Evenly spaced between the two endpieces are saddles 18 which are rigidly attached to the common mandrel 14. Saddle 18, as shown in FIG. 6, has two central discs 20 having central apertures 19 therethrough in which the common mandrel fits perpendicular to the plane of the discs 20. The discs 20 are welded onto the common mandrel 14.

At the outer circumference of the two discs 20 are radiating plates 22, the plane of each includes the central axis of the common mandrel 14. The plates 22 are welded into notches 21 around the outer circumference of the discs. The saddle 18 is aligned with other saddles 18 so that the radiating plates 22 of the different saddles 18 are coplanar. For purposes of illustration, ten plates are shown attached to the discs 20.

Each radiating plate 22 has a thickened outer portion 24 welded onto the plate. For strong support, the plate 22 fits within a grove of the thicker outer portion 24 and is welded therein. The length of the thickened outer portion 24 is coextensive with the outside edge of the radiating plate 22.

The hollow common mandrel 14 and the saddles 18 are desirably made from steel. The endpieces 16 are desirably made from cast iron. The pipe segments 12 are preferably made from abrasion-resistant seamless steel.

The pipe segments and other parts which contact the filtrate slurry can also be made of fiberglass with a ceramic liner for use with an acid solution or a solution corrosive to metal. Other abrasive-resistant and corrosive resistant materials can also be used.

Referring to FIG. 1, the pipe segment 12 is of sufficient length to straddle two saddles 18. Hollow filter-bag connectors 26 are pressfit into apertures on the side cylindrical surface of each pipe segment 12. The apertures are integrally spaced along the pipe segments so as to be aligned with the saddles 18. The connectors 26 have a conduit passage therethrough and have a collar 28 abutting the cylindrical surface of pipe segments 12.

Figure 3:
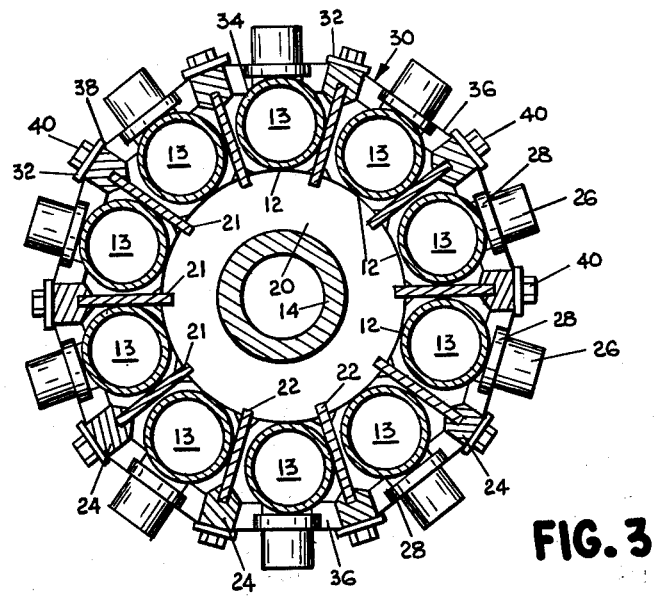
FIG. 3 is a cross-sectional view taken along line 3—3 of FIG. 2.
Figure 7:
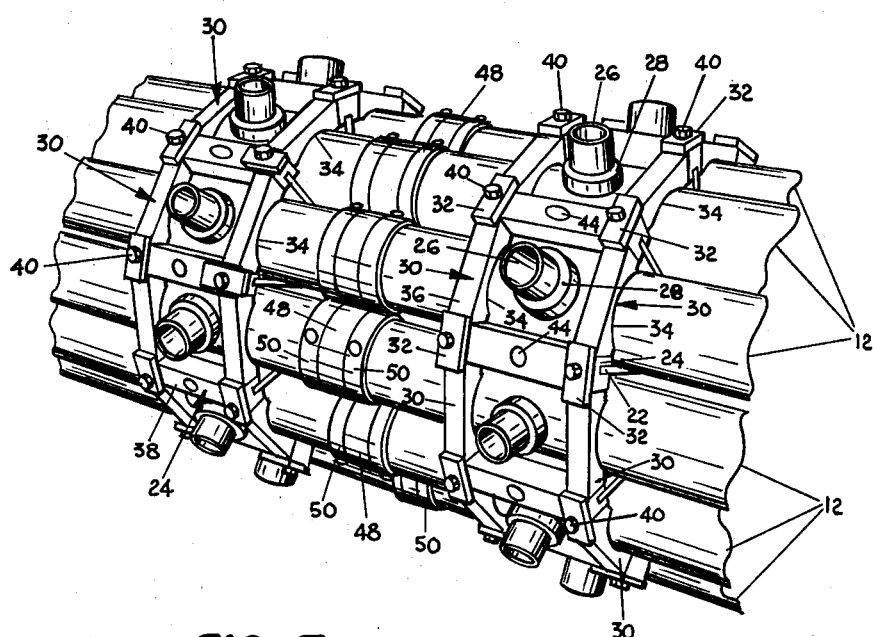
FIG. 7 is a fragmentary view of the structural fabrication of the filter core shown in FIG. 1.

Referring to FIG. 3, the pipe segment 12 is positioned onto the saddle between a pair of radiating plates 22. The filter-bag connectors 26 are aligned between the two plates 22 such that the axis of the connectors radiates away from the common mandrel 14. As shown in FIG. 7, the pipe segment 12 is then secured onto the saddle 18 by locking clamps 30 and locking clips 32. The locking clamps 30 extend between the two radiating plates 22 on each side of the filter-bag connector 26. The locking clamp has an inner arc portion 34 having the same radius as the outside cylindrical surface of the pipe segment 12. The inner arc portion then abuts the cylindrical surface of pipe segment 12. The locking clamp 30 also has a flat outer surface 36 which when positioned on the pipe segment 12 is aligned with outer edge 38 of the thickened outer portion 24.

Rectangular locking clips 32 having apertures therethrough are then placed over the locking clamps 30 and thicker outer portion 24 of radiating plates 22. Threaded bolts 40 pass through the apertures of the locking clips 32 and engage threaded apertures 42 in the thickened outer portion 24 for rotatably mounting the locking clip 32 to the outer portions 24.

The locking clip 32 has a rectangular shape wherein its length is greater than the width of the thickened outer portion 24 and its width is not greater than the width of the thickened outer portion 24. The locking clip 32 engages and secures the locking clamp 30 when the locking clip's longer axis is transverse to the plane of radiating plates 22. Each locking clip 32 engages locking clamp 30 on each side of the thickened outer portion 24. The locking clip 32 disengages from the locking clamps 30 when the longer axis of the locking clip 32 is parallel to the plane of the radiating plate 22. Shown in FIG. 7 are clips 32 positioned in both transverse and parallel positions relative to the thickened outer portion 24.

Threaded apertures 44 extend through the center of the thickened outer portion 24 and are circumferentially aligned with the filter-bag connectors 26. As shown in FIG. 1, threaded fasteners of the filter disc segment 73 engage threaded apertures 44 for securing the filter disc segment onto connectors 26. A plurality of filter disc segments are aligned in a plane to form a circular filter disc 76. Each filter disc segment 73 has a hollow interior 74 in fluid communication with connector 26.

Figure 2:
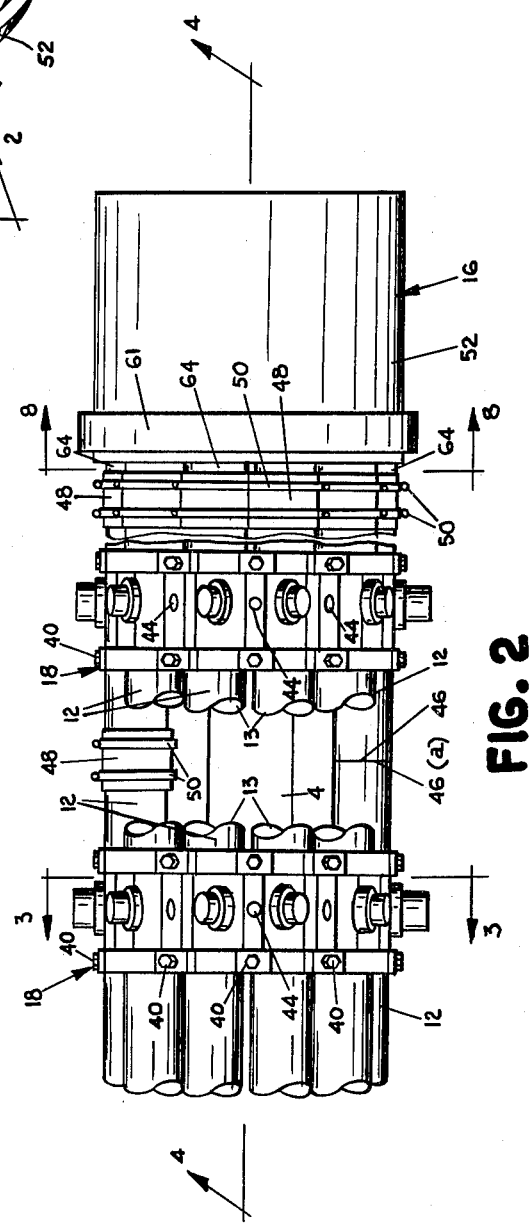
FIG. 2 is a partially broken side elevational view of one end of the filter core along line 2—2 in FIG. 1.
Figure 4:
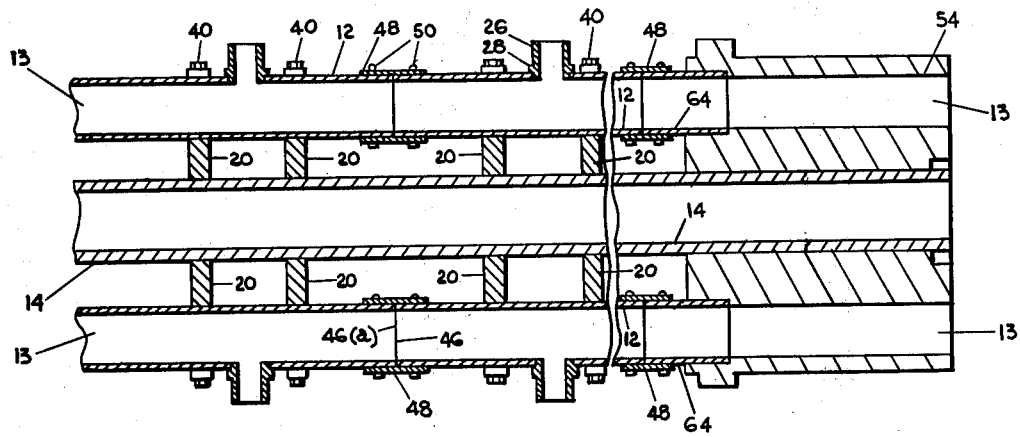
FIG. 4 is a cross-sectional view along line 4—4 of FIG. 2.

Referring to FIGS. 2 and 4, pipe segments 12 are secured onto saddles 18 and are aligned with other pipe segments 12 from other saddles 18. The pipe segment 12 has a length so the end 46 of pipe segment 12 is adjacent to an end 46a of an aligned pipe 12. The aligned pipe segments 12 are then adjoined by a tube connector hose 48 and a pair of tube connector clamps 50. Hose 48 is nonporous and flexible. One material suitable for the hose is "Neoprene," having a fiber fabric reinforcement. Tube connector clamps 50 are standard band-like clamps which clamp the hose 48 to pipe segment 12. The use of the tube connector hose 48 and two connector clamps 50 joining the aligned pipe segments 12 form a continuous conduit passageway 13 running the length of the common mandrel 14.

Figure 10:
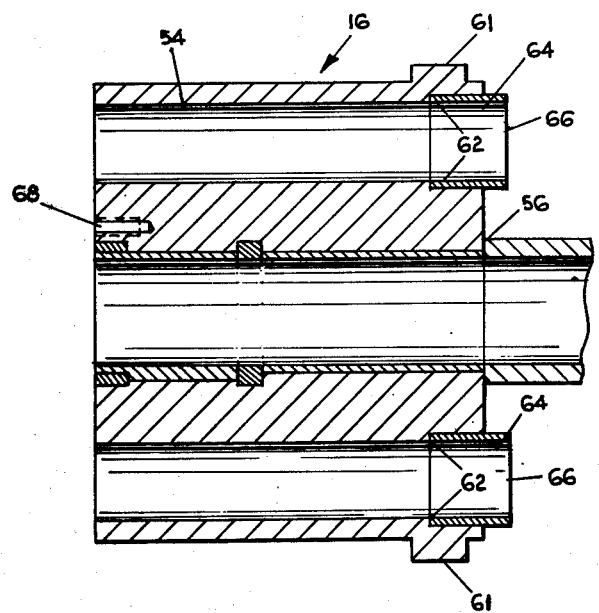
FIG. 10 is a cross-sectional view taken along lines 10—10 of FIG. 9.

As shown in FIG. 5, the common mandrel 14 has at its ends two endpieces 16. The endpiece 16 is cylindrical, having a smooth outer surface 52. The endpiece 16 has its flat surfaces perpendicular to the common mandrel 14. The endpiece is centered with respect to the axis of the common mandrel 14. Apertures 54 are positioned through the endpiece 16. The apertures 54 are of the same diameter and aligned with the inside diameter of pipe segments 12. Referring to FIG. 10, common mandrel 14 has a shoulder 56 abutting the endpiece 16. A narrower section of mandrel 14 extends through the endpiece. At the outer end of the endpiece the common mandrel 14 has a key 58 to fit within a keyway of the endpiece 16.

The apertures 54 have a shoulder 62. The shoulder 62 fits a hollow extender 64. The extender 64 has the same inside and outside diameters as the pipe segments 12. One end of the extender is welded onto the end piece within the shoulder 62. The free end 66 of the extender is adjacent to an aligned end of pipe segment 12. As shown in FIG. 2, tube connector hose 48 and tube connector clamp 50 connect the pipe segment 12 with the extender 64 in the same fashion as the hose 48 and clamps 50 connect two aligned pipe segments 12.

Figure 9:
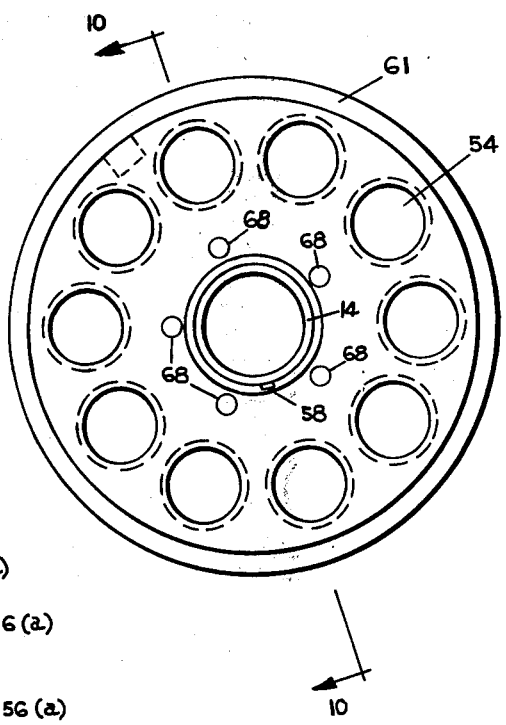
FIG. 9 is an end elevational view of the endpiece of the filter core shown in FIG. 1.

At the outer end of the endpiece 16, shown in FIG. 9, are five tapped holes 68 surrounding the common mandrel. At the inner end of the endpiece 16 around the circumference is a collar 61.

The common mandrel 14 has eight saddles 18 evenly spaced throughout its length and ten aligned pipe passages 13 running the length of the common mandrel. The circumference of the endpiece and fabrication in conjunction with the position of the filter-bag connectors 26 and threaded support apertures 44 make this invention suitable for replacing conventional iron cores without modifying the filter bags, or tank or motor mechanisms which rotate the structural fabrication 10.

Figure 11:
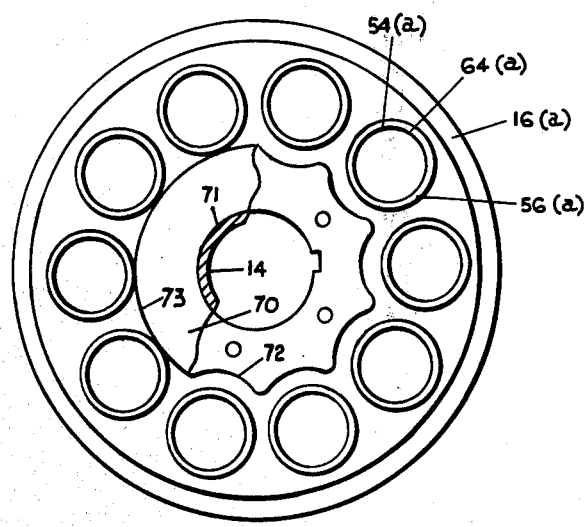
FIG. 11 is a partially broken elevational view of a conventional endpiece which is adapted to be used in a filter core according to the invention.

Endpieces 16 can be formed from conventional endpieces originally attached to an iron core. A conventional endpiece 16a as shown in FIG. 11 can be modified by providing a key slot to the end surface to receive the keyed common mandrel end, and a disc-shaped steel plate 70 being welded onto the common mandrel 14 at its inside edge 71, and onto the inner hollow edges 72 of the conventional endpiece at its outer edge 73. Extender 64a can be inserted into shoulder 56a of the aperture 54a of the conventional endpiece 16a. The extender can then be attached to the aligned pipe segment 12.

As shown in FIG. 1, the outer cylindrical surface 52 of the endpiece 16 is rotatably engaged by the disc filter assembly mounting means 75 which rotates the structural fabrication. The fabrication 10 operates in the same way as a conventional iron core. Rotation of the fabrication dips the filter disc segments 73 into the tank 81 containing filtrate or slurry 83. Liquid is sucked by the vacuum 77 of the filter assembly from the filter through the passages 13 in the fabrication 10.

The repair and maintenance of the fabrication can take place simultaneously with the routine check and maintenance of the disc filter disc segments 73. As an operator routinely checks for tears and other malfunctioning of the filter bags, he can also visually inspect the conduit pipe segments and tube connectors. If a pipe segment 12 is eroded, the pipe segment 12 can be replaced at the time the erosion is discovered.

The removal and replacement of a pipe segment can be accomplished with a minimum amount of labor. The operator detaches the filter-bag nozzle from the connector nipple 24. He then loosens bolts 40 which secure the clips 32 which, in turn, secure the locking clamps 30. Once the bolts 40 are loosened, clips 32 can be turned to disengage from the locking clamps 30. The locking clamps 30 are then removed. The tube connector clamps 50 on both sides of the eroded pipe segment are removed. The eroded pipe segment 12 is then lifted out of its position and is replaced by a new pipe segment 12.

The tube connector clamps 50, locking clamps 30, clips 32 and bolts 40 are then placed back onto the saddle 18 and tightened to secure the new pipe segment in place.

None of the other pipe segments 12 have to be removed when replacing an eroded pipe segment. Only the filter disc segments connected to the eroded pipe segment have to have their nozzles disconnected from the connector 24. Only the one particular eroded pipe segment needs to be replaced. A minimum amount of parts need be touched or replaced in order to repair a broken conduit passageway.

In this manner, the conduit passageways 13 can be easily maintained in a completely repaired state and the structural fabrication 73 can be operated at maximum efficiency.

It should also be understood that the foregoing embodiment of the present invention is merely illustrative of the preferred practice of the present invention and various changes and modifications may be made in the arrangements and details of construction of the embodiments described herein without departing from the spirit and scope of the invention.

The embodiments of the invention in which an exclusive property or privilege is claimed are defined as follows:

1. In a filter disc assembly for use in conjunction with a tank containing a slurry, an elongated central shaft, a plurality of radial segmented filter discs having a hollow interior operably connected to and supported by said central shaft, means for rotatably mounting the central shaft above the tank such that when the shaft rotates the segmented filter discs rotate and each segment alternately enters and withdraws from the tank, and passages through the central shaft circumferentially positioned about a central axis thereof through which a vacuum means is operably connected to the interior of the filter discs, the improvement in the central shaft comprising:

a plurality of pipe segments having hollow interiors, an inlet and an outlet;

an elongated frame comprising a plurality of securing means located along the length of the frame for releasably and replaceably securing each pipe segment circumferentially about the elongated frame such that a replacement pipe segment can be secured by the securing means such that each pipe segment has its longitudinal axis substantially parallel to the axis of rotation of the elongated frame;

each pipe segment having its longitudinal axis in substantial alignment with at least one other pipe segment;

the hollow interiors of at least one pipe segment forming one of the passageways;

the inlet of at least one pipe segment is in fluid communication with the interior of at least one segment of at least one filter disc for allowing passage of filtrate of the slurry from the interior of the filter discs to the interior of each pipe segment;

the outlet of each pipe segment is in fluid communication with the vacuum means for allowing the filtrate to be withdrawn from the interior of each pipe segment.

2. An apparatus as defined in claim 1 wherein:

at least two pipe segments are in fluid communication with each other to form a continuous passageway extending substantially the length of the elongated frame;

the vacuum means is in fluid communication with the continuous passageway.

3. In a filter disc assembly for use in conjunction with a tank containing a slurry, an elongated central shaft, a plurality of radiating segmented filter discs having hollow interiors operably connected to and supported by said central shaft, means for rotatably mounting the central shaft above the tank such that when the shaft rotates, the segmented disc will rotate and each segment of filter disc alternately enters and withdraws from the tank, and passages through the central shaft circumferentially positioned about the central axis thereof through which a vacuum means is operably connected to the interior of the filter discs, the improvement in the rotatable shaft comprising:

a plurality of replaceable pipe segments each having a hollow interior and secured circumferentially about the central axis of the shaft;

an elongated frame comprising at least one reuseable securing means intervally spaced along the elongated frame between two ends of the frame for replaceably securing each pipe segment circumferentially about the elongated frame such that one pipe segment is releasable from the securing means and a replacement pipe segment is securable to the same securing means;

the securing means being operable independently of the filter disc segments which are operably connected to the pipe segments;

each pipe segment has its axis substantially parallel to the central axis of the elongated frame, the hollow interior of at least one pipe segment forming each passage circumferentially positioned about the central shaft;

intake means in the pipe segment for allowing passage of filtrate of the slurry from the interior of the filter discs to the interior of the pipe segment; and egress means coupled to an end of the pipe segment and adapted to be coupled to the vacuum means for allowing the filtrate to be withdrawn from the interior of the pipe segment.

4. An apparatus as defined in claim 3 wherein:

the elongated frame includes a mandrel;

an endpiece rigidly attached to the mandrel and having apertures therethrough which are in fluid communication with the egress means of the pipe segments.

5. An apparatus as defined in claim 4 wherein the elongated frame is a rigid unit which extends from one endpiece to a second endpiece; and the means for rotatably mounting the shaft rotatably mount the endpieces.

6. An apparatus as defined in claim 5 wherein each endpiece has a cylindrical outer surface, each endpiece has the mandrel attached to its center so that the axis of the cylindrical surface of each endpiece and axis of the mandrel are coincidental.

7. An apparatus as defined in claim 4 wherein:
each securing means comprises:
a disc having an aperture through its center;
the mandrel positioned in the aperture and fixedly attached to the disc;
a plurality of spaced plates having an inner edge connected to the circumferential edge of the disc;
the planes of the plates are transverse to the plane of the disc;
clamping means for removably securing the pipe segments between a pair of plates and adjacent the circumferential edge of the disc.

8. An apparatus as defined in claim 7 wherein:
each securing means includes two discs, the plane of each of which is perpendicular to the axis of rotation of the mandrel;
the plurality of plates are rigidly attached to both discs;
each plate radiates outwardly from the disc so that the planes thereof include the axis of the mandrel; and
the clamping means secure each pipe segment between the pair of plates such that a longitudinal axis of the pipe segment is parallel to the rotational axis of the mandrel.

9. An apparatus as defined in claim 8 wherein:
the clamp means include an arced bar fitted between two plates with the arced portion abutting the outside surface of the pipe segment;
clips are attached to the outer portion of each plate;
the clips releasably secure the arced bar in a position abutting the pipe segment so as to fixedly secure the pipe segment between the arced bar, two plates and the disc.

10. An apparatus as defined in claim 7 wherein:
the securing means are aligned with respect to each other so pipe segments in adjacent securing means are in axial registry;
hollow extenders are in fluid communication with the apertures through the endpiece and are aligned with each corresponding pipe segment;
the end of the hollow extender adjoins the outlet of an adjacent aligned pipe segment;
connecting means attach the adjoining outlets of the linearly aligned pipe segments and the aligned extender for forming the passageway for the filtrate; and
the intake means includes a filter disc connector connected to an aperture on the side of the pipe segment for operably fitting a filter disc nozzle such that the interior of at least one segment of the filter disc is in fluid communication with the pipe segment through the connector.

11. An apparatus as defined in claim 10 further comprising a securing means for securing each segment of the filter disc onto the elongated frame and for securing the filter disc nozzle to the filter disc connector.

12. An apparatus as defined in claim 8 wherein the wall of the pipe segment opposite the intake means is a greater thickness than the other walls of the pipe segment.

13. An apparatus as defined in claim 10 wherein the connecting means includes nonporous flexible material snugly fitted around the adjoining ends of the pipe segments, and connector bands fitted around the flexible material on each end of the pipe segment and the end of the extender.

* * * * *